July 6, 1937.  T. H. SCHOEPF ET AL  2,085,872
MAGNETIC TRACK BRAKE SYSTEM
Original Filed Feb. 3, 1936
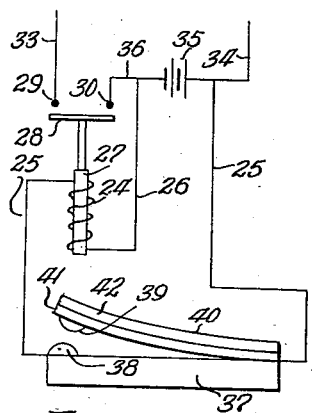
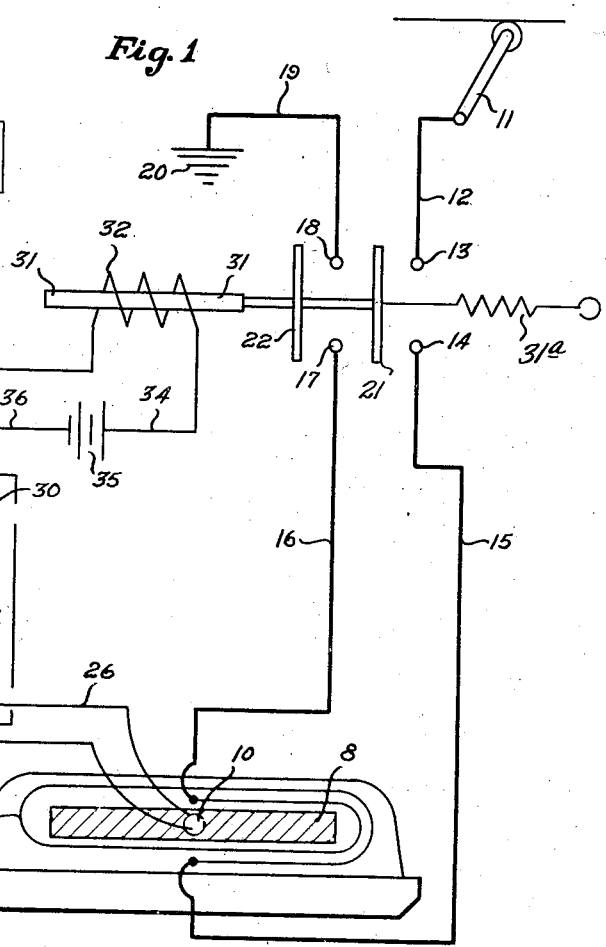
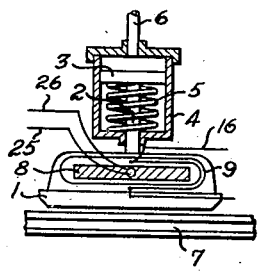
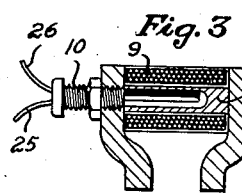
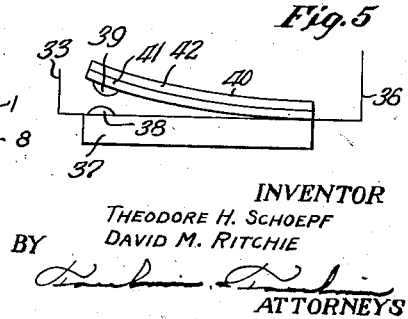
INVENTOR
THEODORE H. SCHOEPF
DAVID M. RITCHIE
BY
ATTORNEYS Patented July 6, 1937

2,085,872

UNITED STATES PATENT OFFICE 2,085,872

MAGNETIC TRACK BRAKE SYSTEM

Theodore H. Schoepf and David M. Ritchie, Cincinnati, Ohio, assignors to The Cincinnati Traction Building Company, Cincinnati, Ohio, a corporation of Ohio Original application February 3, 1936, Serial No. 62,126. Divided and this application October 29, 1936, Serial No. 108,241

8 Claims. (Cl. 188—165)

This invention relates to magnetic brakes.

It is an object of this invention to provide means whereby to prevent damage and/or destruction of the coils of the magnetic brakes, due to the generation of excessive heat therein.

It is an object of this invention to provide means whereby to prevent damage to the coils, due to energizing thereof, after the braking operation has been performed by the brakes.

It is a further object of this invention to provide means responsive to the heat of the brake shoe coils, whereby to interrupt the energizing circuit thereof when a predetermined temperature is reached.

It is a further object of this invention to provide such means which will be responsive both to the heat generated by the energization of the coils and also responsive to the heat generated therein by the friction generated by the brake shoe and the coil during the braking operation.

It is a further object of this invention to provide means whereby to prevent energization of the brake shoe coils in a magnetic braking system after the braking operation has been completed and the vehicle to which the brakes are attached has come to rest, whereby to provide utmost power economy and long life of the brake shoes.

These and other advantages will appear from the following description taken in connection with the drawing, in which are described and shown an illustrative embodiment of this invention.

This application is a division of our application, Serial No. 62,126, filed February 3, 1936.

Referring to the drawing:

Figure 1 is a diagrammatic view of the structure capable of use in the practice of our invention;

Figure 2 is a side elevation, partly in section, showing a magnetic brake shoe and a preferred form of supporting and actuating means therefor;

Figure 3 is a sectional view of the shoe of a magnetic brake having a heat-responsive mechanism inserted in the core thereof according to one practice of our invention;

Figure 4 is a fragmentary diagrammatic view illustrating the substitution, for the thermocouple device illustrated in Figures 1, 2 and 3, of a preferred form of heat responsive switch means; and Figure 5 is a view similar to Figure 4, but illustrating a different connection of the heat responsive switch means shown therein.

Referring to the drawing in detail, as shown in Figure 2 the brake shoe 1 is preferably supported and controlled by the rod 2 having thereon a piston 3, which is supported for reciprocation in the cylinder 4 and normally urged upwardly therein by the spring 5 and adapted to be operated by the force of air introduced through inlet 6 into the cylinder 4 to oppose and overbalance the force of the spring 5. By this means, the brake shoe 1 may be urged downwardly to a position closely adjacent the track rail 7.

The brake shoe 1 is provided with a core 8 and coils 9. When the coils 9 of the brake shoe 1 are energized in a manner which will hereinafter be most clearly described, and when the brake shoe 1 has been positioned in the manner and by the means described above, energization of the coils of the brake shoe 1 will cause application of the brake shoe 1 to the rail 7 of the track whereby to perform the desired braking action on the vehicle to which the brake mechanism is attached.

As most clearly shown in Figure 3 of the drawing, the core 8 of the brake shoe 1 is provided with a bore in which is supported a heat-responsive element 10 illustrated as a conventional thermocouple, although it is, of course, to be clearly understood that other suitable heat-responsive means may be substituted for the means 10 illustrated diagrammatically in Figure 3. The purpose of the heat-responsive element 10 is to cause the flow of current in a desired circuit for the purpose of interrupting the energizing circuit for the coils 9 when the temperature of the brake shoe 1 exceeds a predetermined value. The heat in the brake shoe 1 comprises not only the heat caused by energization of the coils 9 but also the heat caused by friction between the brake shoe 1 and the rail 7 during the braking operation. The heat to which element 10 is responsive is thus dependent upon the coefficient of friction between the brake shoe 1 and the rail 7, upon the intensity of application, upon the length of duration of application of the brake shoe 1 to the rail 7 and upon the intensity of energization of the coils 9 and the duration of the energization of the coils 9.

The energizing circuit for the coils 9 of the brake shoe 1 extends from the trolley 11 through line 12 to switch contact 13. Opposite the switch contact 13 is a switch contact 14 which is connected by means of the line 15 to one terminal of the coil 9. The opposite terminal of the coil 9 is connected by means of line 16 to the switch contact 17. Opposite the switch contact 17 is a switch contact 18 which is connected by means of line 19 with the ground 20. The switch contacts 13 and 14 are normally connected by means of the switch blade 21, and the switch contacts 17 and 18 are normally connected by means of the switch blade 22. While switch contacts 13 and 14 are normally connected by the switch blade 21 and the switch contacts 17 and 18 are normally connected by the switch blade 22, other means, such as that illustrated in our above referred to application, Serial No. 62,126, filed February 3, 1936, is provided for opening and closing the energizing circuit independently of the operation of the normally closed switch which includes the switch blades 21 and 22. In the operation of the brake mechanism of our invention, the application of the brake shoe 1 to the rail 7 is dependent upon energization of the coil 9. If, after application, the coil energizing circuit is interrupted, the brake coil 9 will be de-energized and the brake shoe 1 will be removed from contact with the rail 7. For this purpose means operated through the heat-responsive element 10, is provided for causing the interruption of the energizing circuit for the coil 9 by removal of the switch blade 21 from engagement with the switch contacts 13 and 14 and by removal of the switch blade 22 from engagement with the switch contacts 17 and 18 when the temperature of the brake shoe 1 exceeds a predetermined value.

This means comprises a relay generally designated 23 which includes a solenoid coil 24 having one terminal thereof connected by means of wire 25 with one terminal of the heat-responsive element 10 and having the other terminal thereof connected by means of the wire 26 with the heat-responsive element 10. The relay 23 includes also a solenoid armature 27 provided at its end with the switch blade 28. The relay 23 includes also a pair of switch contacts 29 and 30 which are adapted to be engaged by the switch blade 28 when the solenoid coil 24 is energized. Normally, the solenoid coil 24 is de-energized and the switch blade 28 is removed from engagement with the switch contacts 29 and 30 respectively. As shown in Figure 1 the parts are in the position taken when the solenoid coil 24 is energized by the flow of current in the solenoid energizing circuit due to the current-producing action of the heat-responsive element 10 under the influence of temperature above a predetermined value existing in the brake shoe.

Means is provided whereby energization of the solenoid coil 24, as described above, causes the removal of the switch blades 21 and 22 from their respective contacts of the brake coil energizing circuit whereby to interrupt the brake coil energizing circuit and cause the brake shoe 1 to be de-energized. This means comprises solenoid actuated means for engaging and removing from engagement with their respective contacts the switch blades 21 and 22. As illustrated in Figure 1, the switch blades 21 and 22 are secured in spaced relation on the solenoid armature 31. The solenoid armature 31 cooperates with the solenoid coil 32 to properly position the switch blades 21 and 22.

The solenoid armature 31 is normally biased to the right, as seen in Figure 1, by the spring 31a. When, however, the solenoid 32 is energized, the biasing force of the spring 31a is overcome, and the solenoid armature 31 takes the position shown in Figure 1.

The switch contact 29 of the relay 23 is connected by the wire 33 with one terminal of the solenoid coil 32. The opposite terminal of the solenoid coil 32 is connected by the wire 34 with one terminal of the power source 35. The opposite terminal of the power source 35 is connected by means of wire 36 to the switch contact 30 of the relay 23. Thus, when the switch blade 28 engages the switch contacts 29 and 30, a circuit is completed from the switch contact 30 through wire 36 to power source 35, through wire 34 to solenoid coil 32 and from solenoid coil 32 through wire 33 to switch contact 29 and through switch blade 28 to switch contact 30. This energizes the solenoid coil 32 and causes the parts to take the position illustrated in Figure 1 wherein the switch blades 21 and 22 are so positioned as to interrupt the energizing circuit for the coils 9 of the brake shoe.

*Operation*

When the temperature of the brake shoe 1 is below a predetermined value, the solenoid coil 24 is de-energized because no current is generated by the heat-responsive element 10. The energizing circuit for the solenoid coil 32 is open due to the disengagement of the switch blade 28 from the switch contacts 29 and 30. The solenoid coil 32 is therefore de-energized and the switch blade 21 is in engagement with the switch contacts 13 and 14 and the switch blade 22 is in engagement with the switch contacts 17 and 18.

When the temperature in the brake shoe 1 exceeds a predetermined amount, sufficient current is generated in the heat-responsive element 10 to energize the solenoid coil 24 and thus to cause the solenoid armature 27 to be thrust upwardly to the position shown in Figure 1 whereby to complete the energizing circuit for the solenoid coil 32. The solenoid coil 32 is thus energized whereby to cause leftward movement of the solenoid armature 31 to the position shown in Figure 1 whereby to remove the switch blade 21 from engagement with switch contacts 13 and 14 and to remove the switch blade 22 from engagement with the switch contacts 17 and 18. It is, of course, understood that other heat-responsive switch means may (as shown in Figures 4 and 5) be substituted for the thermocouple 10 illustrated and described above. It is further to be understood that, where the current generated by the above described thermocouple 10 or equivalent means is sufficient to energize the solenoid coil 32, the relay 23 may be omitted. The solenoid and switch operating mechanisms shown are illustrative only, and it is further to be understood that other equivalent mechanical or other means may be used in the same relation to perform the same function. It is further to be understood that solenoids of widely varying operating characteristics may be used and such means as springs, dashpots, counterweights and the like may be used to control the operating characteristics thereof as may be desired. The power source 35 may comprise any suitable source of power such as a battery or other power source.

In Figures 4 and 5, the use of a preferred form of heat responsive switch means is illustrated. The switch mechanism, as therein shown, comprises the base 37 of suitable non-conducting material having thereon a fixed contact 38 and a laminated switch member 40 which is secured to the base 37 at one end and provided with the movable switch contact 39 at the other end. The switch member 40 comprises laminations 41 and 42 of different metals having varying co-efficients of linear expansion. The co-efficient of expansion of the lamination 41 is less than the co-efficient of expansion of the lamination 42. The heat responsive switch mechanism is shown in its normal position in Figures 4 and 5 and, in that position, the contacts 38 and 39 are separated, whereby the heat responsive switch is open. When, however, the switch mechanism is sufficiently heated, the greater linear expansion of the lamination 42 over that of the lamination 41 will cause the switch member 40 to straighten out and place contacts 38 and 39 in engagement. When this occurs, the circuit is closed through the heat responsive switch mechanism.

As shown in Figure 4, the wire 26 connects the solenoid 24 to the wire 36 which leads to one terminal of the source of power 35. The opposite terminal of the solenoid 24 is connected by the wire 25 to the wire 34 which leads to the opposite terminal of the source of power 35. The above-described switch mechanism is inserted in the wire 25 and, as may be clearly understood, the circuit provided by wires 25 and 26 is normally open and the solenoid 24 de-energized. The solenoid armature 31 is then biased to the right by the spring 31a and the brake energizing circuit is complete. When, however, the heat in the brake shoe is sufficient to cause operation of the heat responsive switch mechanism to close the circuit by engagement of contacts 38 and 39, the solenoid 24 is energized to place the switch plate 28 in engagement with contacts 29 and 30 and thus complete the energizing circuit for the solenoid 32. The solenoid armature 31 then takes the position illustrated in Figure 1.

In Figure 5, the above-described heat responsive switch element is shown connected directly in the energizing circuit of the solenoid 32, the relay 23 being omitted. When the heat responsive switch mechanism is so utilized, the wires 33 and 36 are connected respectively to the stationary contact 38 and the heat responsive member 40. Thus, when the brake shoe is sufficiently heated to cause the contacts 38 and 39 to be engaged, the energizing circuit for the solenoid 32 is energized, whereby to overcome the force of the biasing spring 31a and place the solenoid armature 31 in the position shown in Figure 1. The above-described heat responsive switch mechanism is preferably of similar proportions to the heat responsive element 10 and is preferably so mounted with respect to the brake shoe. However, when necessary, the heat responsive switch mechanism may be made larger and more rugged and may be mounted in any suitable manner on the brake shoe.

It will be understood that the above described structure is merely illustrative of the manner in which the principles of our invention may be utilized and that we desire to comprehend within our invention such modifications as come within the scope of the claims and the invention.

Having thus fully described our invention, what we claim as new and desire to secure by Letters Patent is:

1. In a magnetic track brake system including a brake shoe having a core, a coil, and an energizing circuit therefor; switch means in said circuit, solenoid means for operating said switch means to open and close said circuit, and means responsive to the temperature of said shoe adapted to cause said solenoid means to open said switch means when a predetermined temperature of the shoe is reached.

2. In a magnetic track brake system including a brake shoe having a core, a coil, and an energizing circuit therefor; switch means in said circuit, solenoid means for operating said switch means to open and close said circuit, and means including a thermocouple in said shoe adapted to cause said solenoid means to open the switch means when a predetermined temperature of the shoe is reached whereby to prevent overheating of the shoe.

3. In a magnetic track brake system including a brake shoe having a core, a coil, and an energizing circuit therefor; switch means in said circuit, solenoid means for operating said switch means to open and close said circuit, relay means for operating said solenoid means and a thermocouple in said shoe adapted, when a predetermined temperature of the shoe is reached, to cause said relay means to operate said solenoid means to open said switch means, whereby to prevent excessive temperature of the shoe.

4. In a magnetic track brake system including a brake shoe having a core, a coil, and an energizing circuit therefor; switch means in said circuit, solenoid means for operating said switch means to open and close said circuit, relay means for operating said solenoid means, and means responsive to the temperature of said brake shoe adapted, when a predetermined temperature is reached, to cause said relay means to operate said solenoid means to open said switch means and arrest the energization of the shoe whereby to prevent the production of excessive temperature in said shoe.

5. In a magnetic track brake system including a brake shoe having a core, a coil, and an energizing circuit therefor; switch means in said brake coil energizing circuit, an energizing circuit for said switch means, and temperature responsive switch means in said brake shoe connected in said switch energizing circuit and responsive to the temperature in said brake shoe, said temperature responsive switch means being adapted, when said temperature exceeds a predetermined value, to cause said switch means to open said energizing circuit.

6. In a magnetic track brake system including a brake shoe having a core, a coil, and an energizing circuit therefor; normally closed switch means in said circuit, solenoid means for opening said switch and means responsive to the temperature in said brake shoe for energizing said solenoid means to cause said switch means to be opened thereby.

7. In a magnetic track brake system including a brake shoe having a core, a coil, and an energizing circuit therefor; normally closed switch means in said circuit, solenoid means adapted, when energized, to open said switch means, and means responsive to the temperature in the core of said brake shoe for energizing said solenoid means when the temperature of said core exceeds a predetermined value.

8. In a magnetic track brake system including a brake shoe having a core, a coil, and an energizing circuit therefor; normally open temperature responsive circuit switch means in said brake shoe adapted to close when the temperature in said shoe exceeds a predetermined amount, a circuit operatively connected to said temperature responsive circuit switch means and having therein a solenoid coil; and means including a relay switch responsive to the energization of said solenoid coil for causing interruption of the brake coil energizing circuit when said solenoid coil is energized by closing of said temperature responsive circuit switch means.

THEODORE H. SCHOEPF.
DAVID M. RITCHIE.